H. CLARKE.

COMBINATION-LOCK.

No. 6,959. Reissued Feb. 29, 1876.

WITNESSES

Wm A Skinkle

Baltis DeLong.

By his Attorney

INVENTOR

Henry Clarke.

Wm D. Baldwin

N. PETERS, PHOTO-LITHOGRAPHER, WASHINGTON, D. C.

UNITED STATES PATENT OFFICE.

HENRY CLARKE, OF BALTIMORE, MARYLAND, ASSIGNOR TO THE CLARKE LOCK COMPANY.

IMPROVEMENT IN COMBINATION-LOCKS.

Specification forming part of Letters Patent No. 135,523, dated February 4, 1873; reissue No. 5,497, dated July 22, 1873; reissue No. 6,959, dated February 29, 1876; application filed February 14, 1876.

*To all whom it may concern:*

Be it known that I, HENRY CLARKE, of Baltimore city, in the State of Maryland, have invented certain new and useful Improvements in Combination-Locks, of which the following is a specification:

My invention relates to keyless combination-locks of the class in which a series of tumblers or slides move endwise in lines substantially parallel with the shaft or spindle of the lock, and constitutes an improvement on the lock shown in Letters Patent No. 109,386, granted to me November 22, 1870, which, so far as my knowledge extends, shows the first lock of the class hereinbefore referred to.

The subject-matter claimed will hereinafter specifically be designated.

Figure 1:
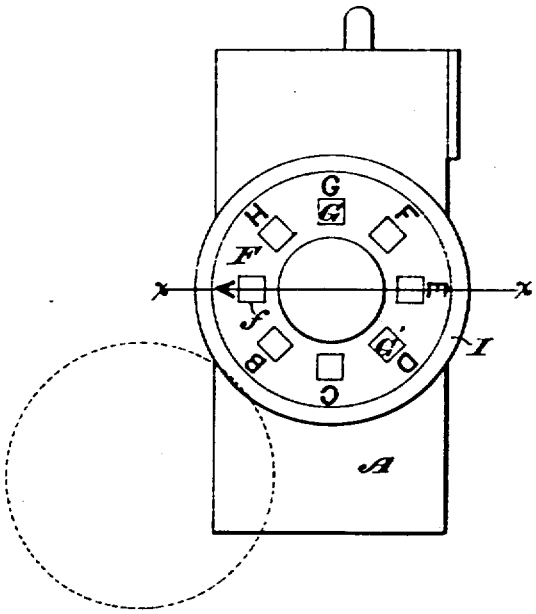
Figure 3:
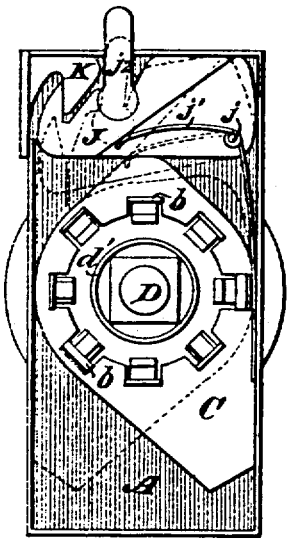
Figure 2:
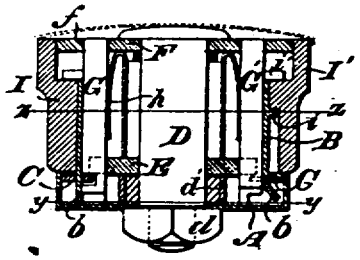
Figure 4:
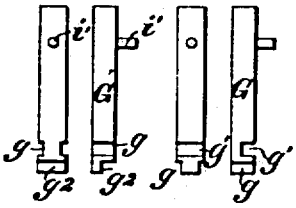
Figure 5:
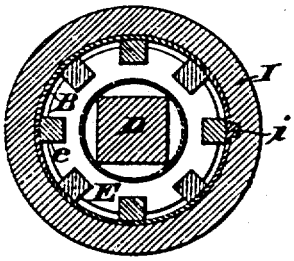

In the accompanying drawings of my improved lock, Figure 1 represents a front or face view; Fig. 2, a vertical section therethrough on the line *x x* of Fig. 1; Fig. 3, a horizontal section on the line *y y* of Fig. 2; Fig. 4 represents detail views of the slides or tumblers. Fig. 5 represents a horizontal section on the line *z z* of Fig. 2; and Fig. 6, a section similar to that shown in Fig. 3, delineating a modification of the lock.

The working mechanism of the lock is mounted on a case, A, adapted to be secured to the inner side of a door or drawer. A portion only of the mechanism is thus inclosed, the greater portion being incased within a sleeve, B, projecting through the outer plate or casing of the lock. This sleeve B passes loosely through the casing, in which it turns freely. Teeth *b*, on the lower edge of this sleeve, protrude through notches or slots in a plate, C, capable of turning freely within the casing, and with the sleeve, the two being interlocked by bending one or more of the protruding teeth outwardly against the plate B. This plate serves as a stop for, or as a means of actuating, the locking-bolt, as will hereinafter be explained. A shaft or spindle, D, passes through the lock-case and forms the axis or pivot of the mechanism.

This shaft may be lengthened so as to form a convenient medium for fastening the lock in position, and is secured by a nut, *d*, screwing onto the inner end of the spindle. A washer, *d'*, is interposed between the back of the lock-plate and the plate C. A plate, E, provided with notches *e* in its periphery for the passage of the tumblers or slides, is mounted upon the spindle, which also carries at its outer end a disk, F, provided with perforations *f* for the passage of the tumblers, which disk forms the face-plate of the lock. The tumblers G G' are, by preference, of two classes, active and passive. They move endwise through the notches of the plate C and perforations in the disk F, above mentioned, and are arranged concentrically around the central spindle D and inside of the sleeve B, against which they are pressed by springs *h*, which compensate their wear and create sufficient friction to hold them in the position in which they may be set.

The springs *h* are shown in the drawing as formed by cutting a sheet-metal cylinder into tapering strips, the number of which is equal to that of the tumblers G G', the strips extending nearly to the notched plate C. All the tumblers are provided with fase notches *g*, for the purpose of misleading any one endeavoring to discover the relative positions to which the notches of the active and passive tumblers may be brought to admit of the turning of the plate C and sleeve B, which is necessary for the release of the locking-bolt. The active tumblers G are provided with grooves or notches $g^1$ of such depth, and at such distance from the disk F, as to allow the teeth in the plate C to pass without coming in contact with said tumblers when in their lowest or innermost position.

The grooves or notches $g^2$ of the passive tumblers G' are at a greater distance from the disk than those of the active tumblers, thereby requiring the passive tumblers to be raised or withdrawn a certain distance, in order to bring their grooves into line with the turning plate to allow its teeth to pass through them.

The turning sleeve B is surrounded by an ornamental band, I, capable of moving endwise upon it, but prevented from turning independently of it by a stop, *i*, working in a slot in the band, extending nearly to its inner edge.

In the drawings this band is shown as formed with a projecting ring or flange, I′, at its upper end, which encircles the disk, the depth of this flange serving as a gage for the longitudinal movement of the band, which is prevented from coming off by the abutting of the disk against its shoulder.

Studs or projections *i′* on the tumblers overlap the inner edge of this band, so that when the band is drawn out the tumblers are protruded through the disk, and when the band is shoved in the tumblers are left thus protruding through the disk, in which position the notches of the passive tumblers are brought into line with the turning plate, and those of the active tumblers are brought into the same line by pushing them inward, when the plate can be turned and the locking-bolt released by the turning of the band.

In Fig. 3, the turning plate C, when in the locking position shown, bears against the back of a hook, J, turning on a pivot, *j*, and provided with a spring, $j^1$, and a thumb-piece, $j^2$. The hook interlocks with a catch, K, secured to the lid or door of a trunk or other object to which this locking device may be applied, and which passes through an opening in the lock-case.

When the plate C is turned into the position shown in dotted lines in Fig. 3, its locking projection is out of the way of the hook, which may then be released from the catch by pressing in the thumb-piece.

The lock shown in the drawing, having a spring-hook, would latch itself by the simple act of shutting the trunk or door to which it is applied.

Figure 6:
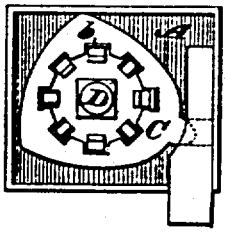

The arrangement of the lock can readily be altered to suit the different objects to which it may be applied; for instance, the turning plate may be directly connected with a bolt corresponding with that of an ordinary lock, as shown in Fig. 6, in which no springs are shown or required, or other modifications in shape or construction may be made, the principle herein shown remaining unchanged.

In Fig. 1 the lock is shown as provided with a lid or cover arranged to swing or slide back upon a pivot like the ordinary shield or cover for key-holes. In Fig. 2 this cover is shown as provided with a flanged rim, to permit of its being slipped endwise over the band.

The use of either lid is to protect the face of the lock and the tumblers from injury by blows, and to keep the parts clean and free from dust.

As the tumblers merely rest in their guideways, they can readily be removed or replaced by withdrawing the disk, and, as they are interchangeable, they can readily be shifted from one guideway to another to vary the combination. Each hole in the disk through which a tumbler passes may for convenience be numbered or lettered.

Eight tumblers are shown in the drawings, respectively marked A, B, C, D, E, F, G, and H. The active tumblers are supposed to be those indicated by the letters A, D, F, and H.

The operation of the lock is as follows: Suppose the parts to be in their locked position, as shown in Fig. 3, and it is desired to unlock it. In this case the band I is pulled out, thus protruding the ends of all the tumblers equally through the disk, the effect of which, as before explained, is to bring the notches of the passive tumblers into the proper position for the turning of the plate, which releases the bolt. The band is then shoved in, leaving the tumblers protruding. The active tumblers A D F H are then shoved in to their original position, bringing their notches into line with those of the false tumblers, and with the teeth of the turning plate. The band is then turned, carrying the sleeve and plate C with it, until the turning plate is brought to the position indicated in dotted lines in Fig. 3, thus, in the form of lock shown in that figure, releasing the spring-hook, so that it can be shoved in by the thumb-piece, and, in the form of lock shown in Fig. 6, directly retracting the bolt.

It is obvious that a person unacquainted with the combination or number of tumblers necessary to be shoved in after all the tumblers have been protruded through the disk would be unable to unlock the lock.

My improved lock, obviously, is applicable to trunks, valises, desks, or any other object or place where locks are usually applied, and has no key to be misplaced.

The Letters Patent No. 109,386, granted to me November 22, 1870, as hereinbefore stated, show a central turning spindle, acting directly on a locking-bolt, and carrying a locking-plate through which a series of tumblers move endwise, said tumblers being surrounded by an endwise movable band or sleeve; but the organization of the lock shown in that patent differs very materially from the one herein shown and described, as will be evident on inspection. For instance, my patent of 1870 has no lock-case, such as shown in the present instance, and its enveloping ring turns with the spindle, whereas in the present case the spindle is fixed, forms the medium through which the turning sleeve and disk are secured to the case, and carries a notched plate and disk, through which the tumblers slide, and the endwise-moving band turns with the sleeve independently of the spindle and of the face-plate, through which the tumblers protrude.

I claim as my invention—

1. The combination, in a keyless lock, of a fixed central shaft or spindle, single independent tumblers, arranged concentrically around, and movable endwise through guides supported on said spindle, a turning sleeve surrounding the tumblers, and a locking-plate, carried by said sleeve, these members being constructed and operating in combination substantially as hereinbefore set forth, whereby the tumblers may be set by the fingers independently of any key.

2. The combination, substantially as hereinbefore set forth, of a lock-case, a locking-plate turning therein, a turning sleeve interlocking with said plate, and projecting from the casing, endwise-moving tumblers surrounded by said sleeve, and endwise-movable band enveloping said sleeve and tumblers, and a removable shaft or spindle, which locks the parts together.

3. The combination, substantially as hereinbefore set forth, of a lock-case, a central spindle, a notched plate, and a perforated disk or face-plate carried thereby, endwise-moving tumblers working in guide-slots in the disk and plate, and the turning sleeve enveloping the tumblers.

4. The combination, substantially as hereinbefore set forth, of the perforated face-plate disk, the endwise-moving tumblers, and the endwise-moving turning band surrounding the disk and tumblers.

5. The combination, substantially as hereinbefore set forth, of the central shaft or spindle, the perforated face-plate, the tumblers, movable endwise through said face-plate, arranged concentrically around said spindle, and independently adjustable to bring their notches into line with the locking-plate.

6. The combination, substantially as hereinbefore set forth, of the turning sleeve, its turning plate and disk, endwise-moving tumblers, inclosed by said sleeve and working through perforations in the face-plate disk, and the locking-bolt actuated directly by the locking-plate.

7. The combination, substantially as hereinbefore set forth, of the central spindle, its disk and plate, the concentrically-arranged tumblers, movable endwise through said disk and plate, the locking-plate, and the locking-bolt, actuated directly by the locking-plate.

HENRY CLARKE.

Witnesses:
E. C. DAVIDSON,
WM. J. PEYTON.